United States Patent
Serrels (10) Patent No.: US 9,885,878 B2
(45) Date of Patent: Feb. 6, 2018

(54) APPARATUS AND METHOD FOR ANNULAR OPTICAL POWER MANAGEMENT

(71) Applicant: DCG Systems, Inc., Fremont, CA (US)

(72) Inventor: Keith Serrels, Fremont, CA (US)

(73) Assignee: FEI EFA, Inc., Fremont, CA (US)

( * ) Notice: Subject to any disclaimer, the term of this patent is extended or adjusted under 35 U.S.C. 154(b) by 80 days.

(21) Appl. No.: 14/250,373

(22) Filed: Apr. 10, 2014

(65) Prior Publication Data

US 2014/0307311 A1    Oct. 16, 2014

Related U.S. Application Data

(60) Provisional application No. 61/810,656, filed on Apr. 10, 2013.

(51) Int. Cl.
  *G02B 27/58*  (2006.01)
  *G02B 21/32*  (2006.01)
  *G02B 21/00*  (2006.01)

(52) U.S. Cl.
  CPC .......... *G02B 27/58* (2013.01); *G02B 21/002* (2013.01); *G02B 21/32* (2013.01)

(58) Field of Classification Search
  CPC ...... G02B 27/10; G02B 27/12; G02B 27/125; G02B 27/58; G02B 21/0068; G02B 21/0072; G02B 21/08; G02B 21/082; G02B 21/084; G02B 21/002; G02B 21/0024; G02B 21/0016; G02B 21/0032–21/004
  USPC ........................ 359/386, 387, 371
  See application file for complete search history.

(56) References Cited

U.S. PATENT DOCUMENTS

| | | | | |
|---|---|---|---|---|
| 5,241,364 A * | 8/1993 | Kimura | ............... | G02B 21/0068 356/491 |
| 6,307,690 B1 * | 10/2001 | Czarnetzki | ........... | G02B 21/082 359/368 |
| 2004/0252372 A1 * | 12/2004 | Karasawa | .......... | G02B 27/0006 359/387 |
| 2005/0190436 A1 * | 9/2005 | Terada | ............... | G02B 21/0016 359/381 |
| 2006/0209398 A1 * | 9/2006 | Weiss | ..................... | G02B 21/02 359/385 |
| 2007/0263203 A1 * | 11/2007 | Typpo | ................ | G01B 11/0691 356/4.03 |
| 2010/0104173 A1 * | 4/2010 | Yoshida | ................ | G03F 7/7065 382/145 |

OTHER PUBLICATIONS

Ng, Y.S., et al., "Next Generation Laser Voltage Probing," ISTFA 2008: Conference Proceedings from the 34th International Symposium for Testing and Failure Analysis (ASM International), Nov. 2008, Portland, Oregon.

(Continued)

*Primary Examiner* — Marin Pichler
(74) *Attorney, Agent, or Firm* — Klarquist Sparkman, LLP (57) ABSTRACT

A system and method for obtaining super-resolution image of an object. An illumination beam is directed through an optical axis onto the object to be imaged. Paraxial rays of the illumination beam are deflected away from the optical axis and into a beam dump. The non-paraxial rays are collected after being reflected by the object so as to generate an image only from the non-paraxial rays.

23 Claims, 3 Drawing Sheets

(56) References Cited

OTHER PUBLICATIONS

Rowlette, J.A., et al., "Critical Timing Analysis in Microprocessors Using Near-IR Laser Assisted Device Alteration (LADA)," ITC International Test Conference, Sep. 30-Oct. 2, 2003, IEEE, pp. 264-273.
Serrels, K.A., et al., "70nm resolution in subsurface optical imaging of silicon integrated-circuits using pupil-function engineering," Applied Physics Letters 94, Feb. 2009, American Institute of Physics.
Serrels, K.A., et al., "Nanoscale optical microscopy in the vectorial focusing regime," Nature Photonics 2, Nature Publishing Group, Mar. 2008.
Serrels, K.A, et al., "Two-Photon X-Variation Mapping Based on a Diode-Pumped Femtosecond Laser", ISFTA 2010, Proceedings from the 36th International Symposium for Testing and Failure Analysis, Nov. 2010, Addison, Texas USA, pp. 14-19.

\* cited by examiner

APPARATUS AND METHOD FOR ANNULAR OPTICAL POWER MANAGEMENT

RELATED APPLICATIONS

The present application claims priority benefit from U.S. Provisional Application Ser. No. 61/810,656, filed on Apr. 10, 2013, the disclosure of which is incorporated herein in its entirety.

GOVERNMENT LICENSE RIGHTS

This invention is based upon work supported by the Office of the Director of National Intelligence (ODNI), Intelligence Advanced Research Project Activity (IARPA), via Air Force Research Laboratory (AFRL) contract number FA8650-11-C-7104. The ideas and conclusions contained herein are those of the inventors and should not be interpreted as necessarily having the official endorsements, either expressed or implied, of ODNI, IARPA, AFRL, or the U.S. Government.

BACKGROUND

1. Field

This disclosure relates to super-resolution optical microscopy, especially beneficial for investigation of structures fabricated in semiconductor materials.

2. Related Art

Various annular illumination and imaging are used in the art for scientific investigation. For example, sub-diffraction-limited (i.e. super-resolution) optical microscopy is used in the art of testing and debug of microchips. Such system generally use laser for illumination and high numerical aperture, e.g., solid immersion lens (SIL), to obtain the high resolution.

Figures 1A, 1B, 2:
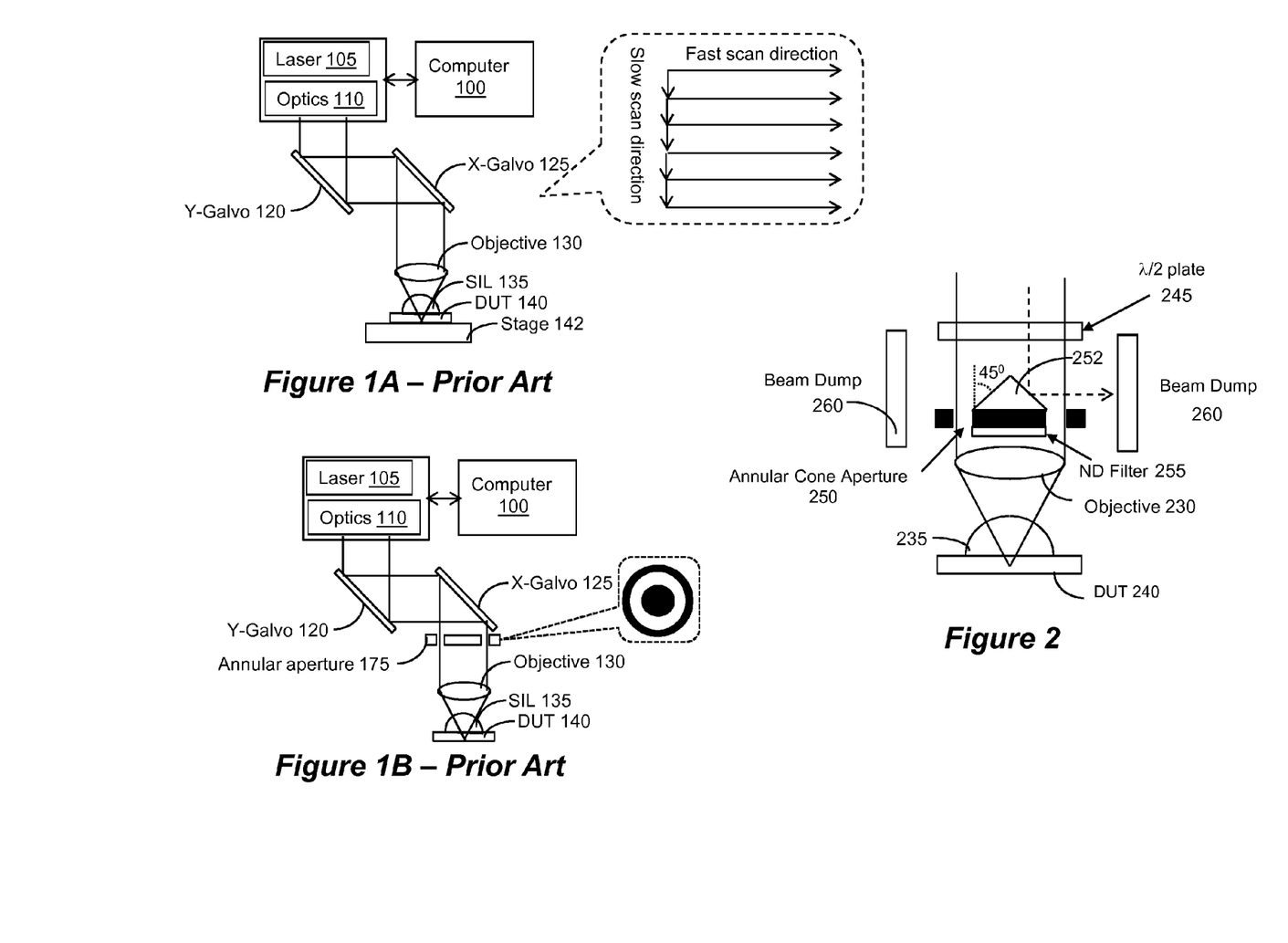
FIGS. 1A and 1B illustrate imaging system configurations according to the prior art.
FIG. 2 is an embodiment of super-resolution system which employs a "beam dumping" approach to avoid heating of the annular aperture.

FIG. 1A illustrates a conventional confocal/laser signal injection microscope. The arrangement consists of a computer 100 and an illumination source 105, such as a laser source. For microchip investigation the laser source 105 may be pulsed or continuous-wave (CW) laser providing beam of wavelength, e.g., 1064 nm or 1340 nm. Confocal optics 110 shapes the beam and directs it onto a scanner, e.g., galvonometer-based scanning mirrors 120 and 125, so as to scan the area of interest through a high numerical aperture objective lens 130 and a solid immersion lens 135. In this example, the back aperture of objective lens 130 is clear (i.e. free of obstructions). This facilitates efficient optical power transmission as well as sufficient resolving capabilities since the high numerical aperture (non-paraxial) components of the incident optical wavefront can contribute towards the interrogation of detailed spatial content from the area of interest.

The lateral spatial resolution performance of these current systems can be enhanced through the use of custom pupil-plane transmission filters (i.e. annular/phase apertures) and/or through vectorial tailoring of the incident electric-field (i.e. through polarization control). An example is illustrated in FIG. 1B. The system of FIG. 1B is similar to that of FIG. 1A, except that a binary amplitude annular aperture 175 is introduced in the beam path. Aperture 175 excludes any low numerical aperture paraxial rays from contributing towards the resulting image, and thus enables a further enhancement of the system's imaging capabilities. As shown in the callout, the annular aperture blocks light rays in the center of the beam, and the amount of blockage can be selected by enlarging or reducing the diameter of the center blocking mask.

Although the above described resolution-enhancements are of significant importance, particularly to the optoelectronic evaluation of nanoscale structures, the use of an annular aperture introduces several system implementation/optimization concerns. For example, the use of an annular aperture leads to a reduced signal being injected/collected due to the blocking aperture. This restriction is of immediate concern since a significant reduction in the transmitted optical power to the device will result in a severely reduced imaging contrast and/or a depleted electrical signal level measured directly from the sample. The power reduction due to the aperture can be overcome by increasing the laser power. However, such a solution leads to other problems, such as heating of the optical elements by the high power laser.

Aperture heating effects may be deleterious to the imaging/probing performance of the system due to thermal expansion effects. Excessive heating in a concentrated area will cause opto-mechanical components in that location to increase in physical size, resulting in a potential disruption to the pre-aligned, and optimized, optical path. It should be noted here that laser-induced heating effects are of particular importance in CW laser imaging and probing investigations using above normal operating powers since the average optical power incident on the component in question will be significantly increased. In order to determine the laser power and/or local temperature required to manifest such negative thermal effects, one must consider the incident optical wavelength used (typically 1064 nm or 1340 nm), the material composition of the opto-mechanical component (for example, protected gold), the corresponding coefficient of thermal expansion of that material (for protected gold this value is 14.2 µm/m/K), the material's thermal conductivity (for protected gold this value is 318 W/m/K) as well as the absorption coefficient of the material (for protected gold this value is 8.69×105/cm at 1064 nm and 8.339×105/cm at 1340 nm). Once these values are understood it is then possible to determine the thermal limitations. For example, one may prefer for the aperture component to be highly absorbing or highly reflecting within their particular configuration. With regard to an absorbing component, it would be beneficial to select a material which has a high absorption coefficient but low thermal expansion/conductivity coefficient in order to efficiently contain the incident optical power within the material without suffering an increase in physical volume or the transfer of excess heat to other mechanical components/mounts. On the other hand, if the aperture was designed to be highly reflective, the material considerations will be tailored to address this issue (e.g. facilitate optimum reflectivity—protected gold is >98% reflective from the visible spectra through to the near IR at normal incidence). There will be limited absorption and hence thermally-induced expansion issues since the majority of the incident optical power will not penetrate the aperture. However, significant back-reflection considerations must then be addressed. These back-reflections could result in a number of detrimental effects; for example, laser source damage and poor imaging performance due to having large background signal incident on the photo detectors.

Another issue that needs to be addressed is multiple back-reflections from the sample, especially if the aperture has a reflective underside. Sample back-reflections may be captured through the transmission region of the aperture and disrupt the imaging performance of the system. Also, in optical probing mode, these back-reflections may be absorbed at different locations across the sample and cause evaluation degradation through photoelectric waveform acquisition, such as in Laser Voltage Probing, or critical timing path analysis, such as in Laser Assisted Device Alteration.

Current super-resolution techniques employing such pupil-function engineered technologies provide no consideration to the negative effects described above. Accordingly, a solution is needed to enable super-resolution microscopy without leading to the problems described above.

SUMMARY

The following summary is included in order to provide a basic understanding of some aspects and features of the disclosure. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to disclosed aspects, careful manipulation and redirection of incident/reflected paraxial optical rays is performed for either thermal management and/or optical signal enhancement/control.

Various disclosed embodiments are particularly relevant to imaging or probing of IC's. Such embodiments enable improved resolution without causing thermal heating of optical elements.

Embodiments disclosed herein may utilize either a continuous-wave or pulsed 1064 nm or 1340 nm laser source, along with the resolution-enhancing techniques of pupil-function engineering in a confocal reflection or InGaAs/MCT camera imaging arrangement in order to facilitate super-resolved optical interrogation for integrated-circuit inspection and analysis.

According to aspects of the invention, a system and method for imaging structures fabricated within an IC are provided. The central part of the illumination beam—which would otherwise hit the central aperture—is diverted away from the optical axis of the system, such that it does not pass to the objective or any other part of the optical path beyond the aperture. Consequently, heating of optical elements is avoided.

According to features of the invention, a system for super-resolution imaging of an object is provided, comprising: an illumination source providing an illumination beam; an objective lens focusing the illumination beam onto the object and collecting the illumination beam after it has reflected from the object; deflection optics positioned in optical path of the system and deflecting central part of the illumination beam away from the optical path; and, a sensor positioned to receive only remaining part of the illumination beam which was not deflected from the optical path of the system.

According to disclosed embodiments, a super-resolution imaging system is provided, comprising: a stage for positioning an object to be imaged; an illumination source providing an illumination beam; an objective lens focusing the illumination beam onto the object and collecting the illumination beam after it has reflected from the object; a solid immersion lens configured to be placed on the object; deflection optics positioned in optical path of the system and deflecting central part of the illumination beam away from the optical path; a beam dump positioned to receive the central part of the illumination beam after it has been deflected by the deflection optics; and, a sensor positioned to receive only remaining part of the illumination beam which was not deflected from the optical path of the system.

Disclosed embodiments include methods of obtaining super-resolution image, comprising: generating an illumination beam; directing the beam towards the object through an optical axis; deflecting paraxial rays of the illumination beam away from the optical axis and into a beam dump; collecting non-paraxial rays of the illumination beam after it has been reflected by the object.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify various embodiments and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements and are, therefore, not drawn to scale.

DETAILED DESCRIPTION

Embodiments of this invention enable enhanced optical imaging of features within a sample. As will be apparent from the proceeding description, disclosed embodiments are particularly advantageous for imaging or probing samples having features fabricated within IC's.

According to various embodiments, various optical arrangements and system architectures are disclosed for obtaining super-resolution imaging. The central part of the illumination beam—which relates to a low numerical aperture is deflected away from the optical path of the system and is not used for imaging.

An optical arrangement according to one embodiment for obtaining super-resolution is illustrated in FIG. 2. The illustration of FIG. 2 includes only the elements relevant to explaining the features of this embodiment. In general, the elements shown in FIG. 2 would be incorporated into standard super-resolution systems, such as those illustrated in FIGS. 1A and 1B, to improve their operation. Also, the system of FIG. 2 incorporates an optional polarization control through the use of a half-wave plate in order to further improve the imaging.

In FIG. 2, a light source, e.g., laser, provides an illumination beam of light that may pass through various optical elements and a scanner, just as shown with respect to FIGS. 1A and 1B. Also, similar to the embodiments of FIGS. 1A and 1B, high-NA imaging of a given sample 240 is obtained through the use of a suitable objective lens 230 and a solid immersion lens 235. The immersion lens may be configured for placement directly on the sample 240. If needed, an optional half-wave plate 245 is inserted in the optical path to provide polarization control. In order to deflect the central part of the illumination beam, e.g., paraxial rays, a cone-shaped annular aperture 250 is positioned in the pupil-plane of the objective lens. The apex of the cone faces the incoming illumination beam, while the base of the cone faces the objective lens. As shown in FIG. 2, the annular aperture 250 has a cone shaped reflector 252, which deflects the part of the illumination beam which would otherwise illuminate and heat the central blocking part of the standard annular aperture. This is exemplified by the dashed arrow.

Also included in the embodiment of FIG. 2 is anti-reflection (AR) coated neutral-density (ND) filter 255 and a suitably positioned beam dump 260. The anti-reflection filter faces the objective lens so as to attenuate reflections from the base of the cone-shaped reflector 252. The cone aperture in this embodiment is fabricated to have side walls which slope at exactly 45° to the optical axis in order to efficiently and effectively reject the unwanted non-paraxial rays, at 90°, from the optical axis of the imaging system. As can be appreciated, the conical section need not be at 45°, but may be at other suitable angles. The idea here is that the beam is reflected off of the optical axis and is collected by a beam dump. Indeed, right angled reflection may not be perfectly dumped from the system, which raises the possibility of creating direct reflections back into the laser. A non-right-angled beam collection and dissipation scheme may be more effective, since any reflections off the surfaces will then be captured by the surfaces located on the opposite side of the beam dump.

The beam dump 260 is configured to be concentrically arranged around the cone aperture to facilitate the capture of all of the negating optical rays. Furthermore, the beam dump 260 should consist of a suitable optical material for efficient optical absorption. It should be appreciated that the beam dump 260 is annular having ring-shaped beam acceptance opening positioned concentrically with the cone shaped reflector 252, such that it is capable of accepting light reflected at 360° around the cone shaped reflector 252. The beam dump will not impede the optical performance of the systems through thermal expansion manifestations and/or optical leakage back into the optical path, as it is not part of the imaging optics. In addition, to address the possibility of inducing multiple back-reflections between the sample and the underside of the aperture, a ND filter 255, positioned after the aperture cone, will collect and remove any returned light from this area.

Partial-beam diversion and dumping can be performed using various methods. The first objective is to divert from the optical path the part of the illumination beam that would have otherwise be blocked by the central part of the annular aperture. In the embodiment of FIG. 2, this is done by the cone shaped reflector 252. Consequently, the diverted part of the beam does not contribute to the imaging process. As can be understood, while a cone-shaped reflector is used in the embodiment of FIG. 2, other convex-shaped reflectors may be used. A second objective is to ensure that the part of the beam that was diverted does not add noise to the system by reflecting off of various parts of the system. In the embodiment of FIG. 2, this is done by the concentric light-absorbing beam dump 260.

Figures 3, 4, 5:
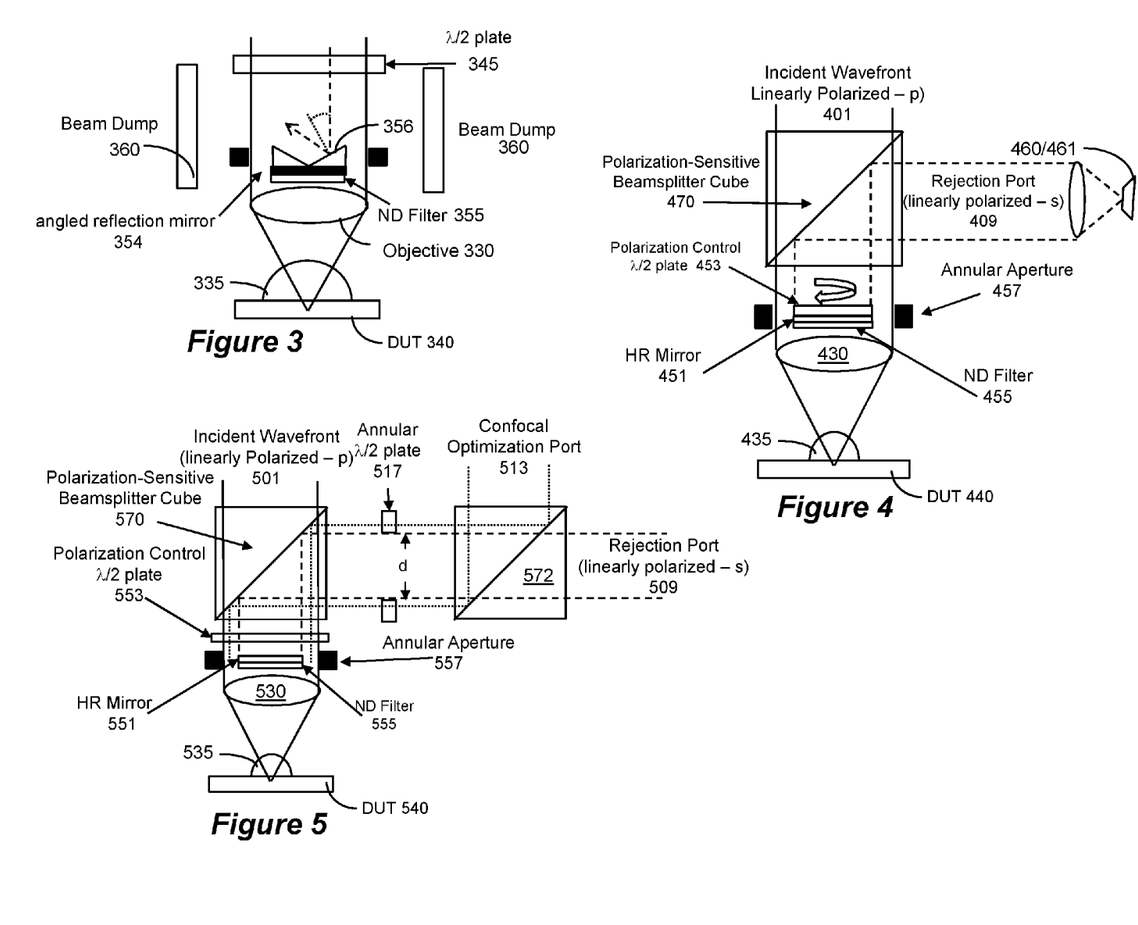
FIG. 3 is another embodiment of super-resolution system which employs a "beam dumping" approach to avoid heating of the annular aperture.
FIG. 4 illustrates an embodiment of an alternate method for super-resolution configuration using highly-reflective annular stack approach.
FIG. 5 illustrates an embodiment of an alternate method for super-resolution configuration using returned polarization optimization approach.

Another example of partial-beam diversion and dumping approach is illustrated in FIG. 3. The example illustrated in FIG. 3 can be conceptualized as the inverted, or inverse, approach to that described in the example of FIG. 2. In this embodiment, the cone-shaped reflector is replaced by an annular angled reflection mirror 354, having angled concave mirror surface 356. The highly reflecting surface 356 is bored into the aperture at an angle chosen to avoid unwanted back-reflections into the collection optics above. As in FIG. 2, a beam dump 360 is concentrically arranged around the angled aperture to facilitate the capture all of the negating (i.e. reflected) optical rays. Furthermore, the beam dump 360 will consist of a suitable optical material for efficient optical absorption. The beam dump will not impede the optical performance of the systems through thermal expansion manifestations and/or optical leakage back into the optical path. In addition, to address the possibility of inducing multiple back-reflections between the sample and the underside of the aperture, a ND filter 355, positioned after the annular angled reflection aperture, will collect and remove any returned light from this area.

As can be seen from the above, partial-beam diversion can be done by deflecting the unwanted part of the beam away from the optical axis or optical path. Alternatively, a highly-reflective multi-stack planer annular aperture can be used with additional polarization control to reject strong unwanted back-reflections. An example of this approach is illustrated in FIG. 4. In this configuration, the incident pre-polarized optical wavefront 401 will efficiently traverse a polarization-sensitive beamsplitter cube 470 and strike the planer annular aperture 457. However, the aperture will consist of a half-wave plate 453, a highly reflective (HR) binary amplitude annular aperture 451 as well as a subsequently positioned AR coated ND filter 455. This aperture stack will be positioned in the pupil-plane of the objective lens to control the polarization state of the back-reflected linearly polarized laser beam 409 as well as the transmitted annular illumination components. By controlling the polarization direction of the reflected paraxial rays of the system, one can efficiently reject these unwanted high-intensity paraxial components 409 by way of the previously traversed polarization-sensitive beamsplitter cube 470. The rejected component 409 can be directed to a standard single-port beam dump 460. Example of such a beam dump is the Model PL15, available from Newport Corporation of Irvine, Calif. Alternatively, the beam can be collected onto a sensor 461 and used, e.g., as a reference for beam power to control the laser power. Incidentally, sensing the rejected beam rather than simply using beam dump can be implemented in any of the other embodiments disclosed herein.

The usability and magnitude of the partial-beam deflection using the polarization effect can be optimized by mounting the annular half-wave plate in a manual or computer-controlled rotation stage (exemplified by the curved arrow) in order to address the requirement of obtaining an orthogonally-orientated reflected polarization state when compared to the incident polarization state. If the PBS cube always transmits p-polarized light then there is no need for the subsequent half-wave plate to be mounted in a manual or computer-controlled rotation stage since it will already be pre-biased to 45°, which satisfies the 90° rotation requirements for rejection. This can be achieved by positioning the halfwave plate's transmission axis at 45° to that of the incident polarization state. In a single pass arrangement, the polarization state will be rotated through 45°; however, in this double-pass arrangement (facilitated by the HR mirror 451) the polarization state will be rotated by another 45°, resulting in a total rotation of 90°. It is this 90° rotation which will comprise the returned optical polarization state towards the polarization-sensitive beamsplitter cube 470. Furthermore, the AR coated ND filter 455 will offer the same protection as described above. This scheme will remove the deleterious effects of thermally-induced opto-mechanical activity within the annular aperture, since no absorption of the incident optical radiation will be permitted.

In addition, for laser signal-injection microscopy techniques, e.g., for Laser Assisted Device Alteration (LADA), one is not initially concerned with the polarization state of the light returned from the sample, since the static or parametric information under investigation is acquired from an independent source (i.e. the device under test). In such investigations the laser illumination is used to image the device for navigation, CAD alignment and coarse localization. During the actual testing; however, the laser beam is used only to perturb the device, while the device's response is sensed using the IC's electrical output.

However, with regard to confocal reflection microscopy, the polarization state of the returned light from the sample may prove to be important, since some of this information may be captured, and ultimately lost, by the rejection port instead of the confocal detection optics if light-matter interactions modify the returned polarization state within the DUT. Under these conditions, valuable imaging information may be separated in to the p- and the -s-polarized ports of the PBS cube (570). This can be avoided, however, through careful consideration of the annular-based sample reflection information contained within the rejection port. An example for a system implemented to catch this information is illustrated in FIG. 5. The example of FIG. 5 builds upon the example of FIG. 4, in that the incident beam 501 is linearly polarized so as to pass through the polarization-sensitive beamsplitter cube 570. As in the embodiment of FIG. 4, the central occlusion of annular aperture 557 is made of three layers: a halfwave plate 553, a mirror 551, and an ND filter 555. However, in this embodiment the halfwave plate 533 is extended to cover the annular aperture, such that the blocked part of the beam and the remainder part of the beam that is used for imaging pass through the halfwave plate 553. Consequently, on the return path, both the partial beam reflected by the mirror 551 and the annular beam reflected from the DUT 540 are diverted from the optical axis by the beamsplitter 570. An annular half-wave plate 517—i.e. the spatial inverse of halfplate 553 is positioned before a second polarization-sensitive beamsplitter 572, located in the rejection port stage. The diameter d of the central non-polarized transmission region of halfplate 553 matches the diameter of mirror 551. Consequently, the central part of the beam which was reflected from mirror 551 is not affected by halfwave plate 517 and, therefore, passes through beamsplitter 572 to the rejection port 509. On the other hand, the polarization state of the returned illumination from the sample passes through the polarizing part of halfplate 517 and is, therefore, deflected by beamsplitter 572 towards a confocal optimization port 513.

As can be understood, the basic operation of the embodiment of FIG. 5 is as follows. A P-polarized illumination light 501 passes through PBS cube 570. Paraxial p-polarized light is rotated by 90° by the double pass through half-wave plate 553 (due to reflection from mirror 551). The now s-polarized paraxial light is rejected by PBS cube. The high-NA p-polarized light rotated by 45° by half-wave plate 553 and is transmitted through the annular aperture 557 towards the objective lens. The high-NA 45° rotated light strikes the DUT and is reflected back through annular aperture 557. The reflected high-NA 45° rotated light is rotated to s-polarized light by half-wave plate 553 and is also rejected by PBS cube 570. The high-NA s-polarized rejected light is then converted back to p-polarized light by annular half-wave plate 517. The second PBS cube 572 separates light from annular aperture and DUT.

The sample may introduce modifications to the initial imaging polarization state upon interaction and reflection from the various layers, features, dielectric environments, etc. Therefore, the descriptions above attempt to control this situation by offering flexibility in the polarization control optics, e.g., by allowing rotation of the halfwave plates. The feature of cumulatively collecting and combining polarization components is achieved by adding together the same polarization components from different detectors for enhanced SNR. With regards to post-biasing of the returned polarization state, this can be done so as to optimize the imaging capabilities by rotating the returned polarization into any state wanted, e.g. back to the initial state after being rotated by the sample by some degree or by capturing multiple images of different returned polarization states.

Figure 6A:
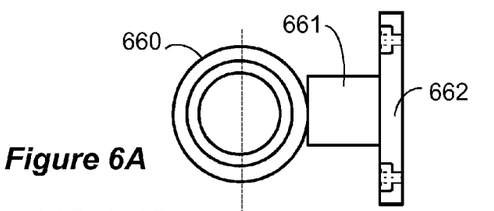
FIGS. 6A and 6B illustrate a top view and a side view, respectively, of an embodiment for annular beam dump.
Figure 6B:
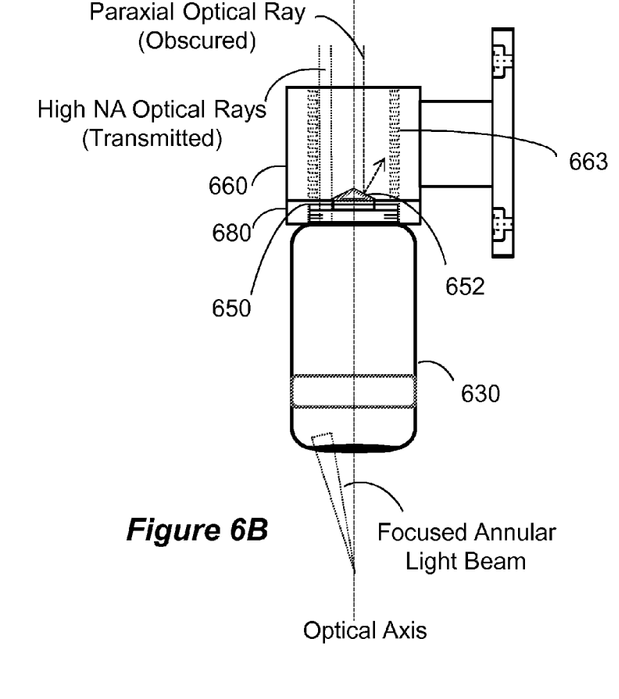

FIGS. 6A and 6B illustrate a top view and a side view, respectively, of an embodiment for annular beam dump which may be used, e.g., in the system of FIGS. 2 and 3. The body of the annular beam dump 660 is attached to a support fixture 661, which is held by a mounting bracket 662. Paraxial optical rays are reflected by the conical mirror 652, and are absorbed by absorbing layer 663, which is provided all around the interior walls of the annular beam dump 660. High NA rays pass through the annular aperture 650 and enter the objective lens housing 630. In this particular embodiment, an X-Y centration stage 680 is provided between the beam dump housing 660 and the objective lens housing 630, so as to enable relative alignment between these two elements. Alternatively, the objective lens housing 630 can be attached to an objective turret, such that objectives of different magnifications can be used with the beam dump and annular aperture.

Figure 7:
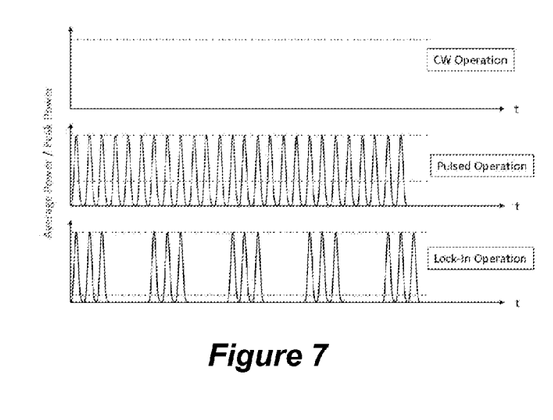
FIG. 7 is a plot illustrating CW vs. pulsed vs. lock-in operational schemes.

Furthermore, as illustrated in FIG. 7, it should be noted that a separate method for removing unwanted heating effects within the annular aperture may be to utilize an ultrafast laser source. Under CW operation, the collimated laser is always on and will therefore deliver a large average power to the component—the dominant mechanism behind absorption/thermal interactions. Pulsed operation, on the other hand, will significantly reduce this average value component since the laser is effectively off for longer than it is on. For example, if the laser pulse duration is 200 fs and the repetition-rate is 100 MHz, the laser is only on for 200 fs whereas it will be off for 10 ns until the next pulse arrives. This will reduce the thermal activity within the aperture dramatically. Note here that care must be taken to consider the laser's pulsed characteristics when investigating laser-induced damage effects. Knowledge of the pulse repetition rate, the energy density (i.e. total energy divided by $1/e^2$ area), the beam diameter (i.e. $1/e^2$ point), the approximate intensity profile (e.g., Gaussian), the wavelength of the laser and the pulse duration will all help to understand potential damages. Also, in addition, if a lock-in amplifier configuration were adopted, then the laser pulses will be switched on and off at a much lower modulation frequency (e.g.

1-kHz) which will further reduced the build up of thermal activity within the aperture. These pulsed or modulated operational configurations will not limit or reduce the imaging capabilities of the system but may not be applicable to all imaging/probing platforms.

In addition, with regard to controlling the returned polarization state for imaging optimization/enhancement, the concepts disclosed above need not be restricted to integrated-circuit inspection and characterization. The introduced benefits may provide advantages to any optical interrogation platform that utilizes annular apertures and polarization control for enhanced resolution, where the physical structures under examination are comparable to the wavelength of the free-space/fiber-coupled light source used. Such an example would be the inspection of silicon solar cells.

When an obscuration aperture becomes a standard feature to improve resolution, only a certain percentage of the laser is striking the sample. Further the returning/reflected beam is again reduced by the same percentage, at least to first order. Thus the beam containing sample information is reduced by the square of the percentage obscured. To recover the signal, the laser would need to have its power raised by 1/(obscured %)$^2$. For example, if obscuration of 50% is utilized, then laser power to obtain the equivalent signal as before would be raised by 4×. Thus the need for the solutions described herein becomes greater.

Finally, these solutions need not be limited to laser systems. Other illumination systems that can be used with the disclosed embodiments include flash-lamp, light-emitting diode (LED) as well as super-luminescent LED (SLED) sources, where thermal effects may also be considered. For example, in an emission system, an LED is generally used for illumination to the subject for orientation reasons to provide a context for the emissions that are to be detected.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for super-resolution imaging of an object, comprising:
   an illumination source providing an illumination beam;
   an objective lens focusing the illumination beam along an optical path onto the object and collecting the illumination beam returned from the object;
   deflection optics situated to deflect a central part of the illumination beam propagating along the optical path toward the object away from the optical path, the deflection optics including an annular aperture that is situated to block a central part of the illumination beam received from the object;
   a rejection port receiving the central part of the illumination deflected by the deflection optics;
   an anti-reflection coated neutral density (ND) filter positioned between the deflection optics and the objective lens to attenuate multiple back-reflections between the object and the deflection optics; and,
   a sensor positioned to receive a part of the illumination beam returned from the object and transmitted by the annular aperture.

2. The system of claim 1, wherein the central part comprises paraxial rays and the part of the illumination beam returned from the object and transmitted by the annular aperture to the sensor comprises non-paraxial rays.

3. The system of claim 1, further comprising a beam dump positioned to receive the central part of the illumination beam after it has been deflected by the deflection optics.

4. The system of claim 1, wherein the annular aperture having a central cone-shaped mirror occlusion having its apex pointed away from the objective lens and its base facing towards the objective lens.

5. The system of claim 4, further comprising an annular beam dump positioned around the annular aperture to receive the central part of the illumination beam after it has been deflected by the cone-shaped mirror occlusion.

6. The system of claim 5, wherein the anti-reflection coated ND filter is provided on bottom surface of the central occlusion in a position facing the objective lens.

7. The system of claim 1, wherein the annular aperture comprises a central concave circular mirror occlusion having its base facing the objective lens.

8. The system of claim 6, further comprising an annular beam dump positioned around the annular aperture to receive the central part of the illumination beam after it has been deflected by the concave circular mirror occlusion.

9. The system of claim 7, wherein the anti-reflection coated ND filter is provided on a bottom surface of the central occlusion in a position facing the objective lens.

10. The system of claim 1, wherein the deflection optics comprises:
    a polarization sensitive beam splitter; and,
    wherein the annular aperture having a central circular occlusion positioned between the beam splitter and the objective lens so as to block the central part of the illumination beam from reaching the objective lens; wherein the central annular occlusion comprises a halfwave plate facing the polarization sensitive beam splitter, the anti-reflection coated ND filter facing the objective lens, and a mirror sandwiched between the halfwave plate and the anti-reflection filter and facing the beam splitter.

11. The system of claim 10, further comprising a beam dump positioned to receive the central part of the illumination beam after it has been deflected by the beam splitter.

12. The system of claim 10, further comprising a sensor positioned to receive the central part of the illumination beam after it has been deflected by the polarization sensitive beam splitter.

13. The system of claim 1, wherein the deflection optics comprises:
    a polarization sensitive beam splitter; and
    a halfwave plate facing the polarization sensitive beam splitter positioned between the polarization sensitive beam splitter and the objective lens;

wherein the annular aperture of the deflection optics has a central circular occlusion positioned between the halfwave plate and the objective lens so as to block the central part of the illumination beam from reaching the objective lens; wherein the central circular occlusion comprises a mirror facing the polarization sensitive beam splitter and reflecting the central part of the illumination beam towards the polarization sensitive beam splitter; and wherein the anti-reflection coated ND filter faces the objective lens.

14. The system of claim 13, further comprising:
an annular halfwave plate having a non-polarizing central part and a polarizing ring around the non-polarizing central part, the annular halfwave plate positioned to as to receive the illumination beam after it has been deflected by the polarization sensitive beam splitter; and,
a second beam splitter positioned to receive the illumination beam after it has passed through the annular halfwave plate and configure to pass the part of the illumination beam that passed through the non-polarizing central part of the annular halfwave plate, and to deflect the remaining part of the illumination beam.

15. The system of claim 14, further comprising a beam dump positioned to receive part of the illumination beam that passes through the non-polarizing central part of the annular halfwave plate.

16. The system of claim 14, further comprising a power sensor positioned to receive the central part of the illumination beam after it has been deflected by the polarization sensitive beam splitter.

17. A super-resolution imaging system, comprising:
a stage for positioning an object to be imaged;
an illumination source providing an illumination beam;
an objective lens focusing the illumination beam onto the object and collecting the illumination beam after it has reflected from the object;
a solid immersion lens configured to be placed on the object;
deflection optics positioned in optical axis of the system so as to deflect a central part of the illumination beam propagating toward the object to be imaged away from the optical axis, the deflection optics comprising an annular aperture situated to block a central part of the illumination beam received from the object;
a power referencing detector positioned to receive the central part of the illumination beam propagating toward the object to be imaged deflected by the deflection optics; and
a sensor positioned to receive only remaining part of the illumination beam which was not deflected from the optical axis of the system, after the remaining part of the illumination beam has been reflected by the object.

18. The system of claim 17, wherein the annular aperture comprises a central circular occlusion with an angled mirror positioned to receive the illumination beam and deflect the central part of the illumination beam away from optical axis of the system and into a beam dump or the power referencing detector.

19. The system of claim 17, wherein the deflection optics comprises:
the annular aperture, wherein the annular aperture has a central mirrored occlusion positioned to receive the illumination beam and reflect the central part of the illumination beam; and a beam splitter positioned to receive the central part of the illumination beam after it has been reflected by the mirrored occlusion and deflect the central part of the illumination beam away from optical axis of the system and into a beam dump or the power referencing detector.

20. A method,
comprising:
generating an illumination beam;
directing the illumination beam towards an object situated on an optical axis;
deflecting a paraxial portion of the illumination beam directed towards the object away from the optical axis and into a beam dump;
collecting a non-paraxial portion of the illumination beam received from the object and directing the non-paraxial portion to a sensor; and
stopping a paraxial portion of the illumination beam received from the object from reaching the sensor.

21. A system for super-resolution imaging of an object, comprising:
an illumination source providing an illumination beam;
an objective lens focusing the illumination beam onto the object and collecting the illumination beam after it has reflected from the object;
deflection optics positioned in optical path of the system and deflecting central part of the illumination beam away from the optical path, the deflection optics comprising:
a polarization sensitive beam splitter,
a halfwave plate facing the beam splitter positioned between the beam splitter and the objective lens, and
an annular aperture having a central circular occlusion positioned between the halfwave plate and the objective lens so as to block the central part of the illumination beam from reaching the objective lens; wherein the central circular occlusion comprises a mirror facing the beam splitter and reflecting the central part of the illumination beam towards the polarization sensitive beam splitter and wherein the annular aperture is situated to block a central part of the illumination beam after it has been reflected from the object;
a rejection port receiving the central part of the illumination deflected by the deflection optics;
an anti-reflection coated neutral density filter positioned between the deflection optics and the objective lens and facing the objective lens to attenuate multiple back-reflections between the object and the deflection optics; and
a sensor positioned to receive only remaining part of the reflected illumination beam which was not blocked by the annular aperture from the optical path of the system.

22. A super-resolution imaging system, comprising:
a stage for positioning an object to be imaged;
an illumination source providing an illumination beam;
an objective lens focusing the illumination beam onto the object and collecting the illumination beam after it has reflected from the object;
a solid immersion lens configured to be placed on the object;
deflection optics positioned in optical axis of the system and deflecting central part of the illumination beam away from the optical axis, the deflection optics comprising:
an annular aperture having a central mirrored occlusion positioned to receive the illumination beam and reflect the central part of the illumination beam, wherein the annular aperture is further situated to block a central part of the illumination beam after it has been reflected by the object, and a beam splitter positioned to receive the central part of the illumination beam after it has been reflected by the mirrored occlusion and deflect the central part of the illumination beam away from optical axis of the system and into a beam dump or power referencing detector;

a power referencing detector positioned to receive the central part of the illumination beam after it has been deflected by the deflection optics; and, a sensor positioned to receive only remaining part of the illumination beam which was not deflected from the optical axis of the system, after the remaining part of the illumination beam has been reflected by the object.

23. An imaging system, comprising:

an illumination source providing an illumination beam;

an objective lens situated to focus the illumination beam along an optical path onto an object and collect the illumination beam returned from the object;

deflection optics situated to deflect a central part of the illumination beam propagating along the optical path toward the object away from the optical path;

a rejection port receiving the central part of the illumination deflected by the deflection optics;

an anti-reflection coated neutral density (ND) filter positioned between the deflection optics and the objective lens to attenuate multiple back-reflections between the object and the deflection optics; and a sensor positioned to receive a part of the illumination beam returned from the object and transmitted by the deflection optics.

* * * * *